(No Model.)

H. BARNES, Dec'd.
A. L. BARNES, Administratrix.
FRICTION CLUTCH.

No. 386,287. Patented July 17, 1888.

Witnesses
S. N. Piper
R. B. Torrey

Inventor
Henry Barnes
by R. H. Eddy, atty

UNITED STATES PATENT OFFICE.

HENRY BARNES, OF HYDE PARK, MASSACHUSETTS; ANN L. BARNES, OF ORANGE, MASSACHUSETTS, ADMINISTRATRIX OF SAID HENRY BARNES, DECEASED.

FRICTION-CLUTCH.

SPECIFICATION forming part of Letters Patent No. 386,287, dated July 17, 1888.

Application filed May 2, 1887. Serial No. 236,811. (No model.)

*To all whom it may concern:*

Be it known that I, HENRY BARNES, of Hyde Park, in the county of Norfolk, of the Commonwealth of Massachusetts, have invented a new and useful Improvement in Friction-Clutches; and I do hereby declare the same to be described in the following specification and represented in the accompanying drawings, of which—

Figure 1:
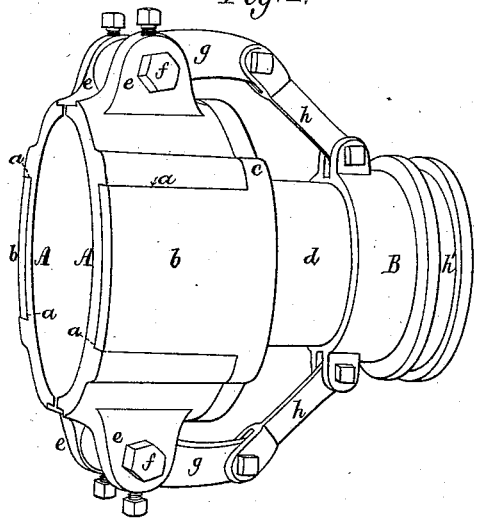
Figure 2:
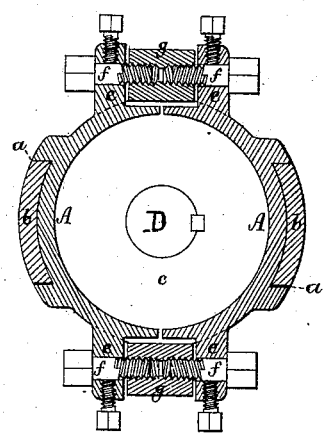

Figure 1 is a perspective view, Fig. 2 a transverse section, and Fig. 3 a longitudinal and median section, of a friction-clutch embodying my invention, the nature of which is defined in the claim hereinafter presented.

My said friction-clutch is provided with arcal jaws, to embrace or nearly encompass a cylindrical projection extending from a wheel or pulley to which the clutch, fixed on a shaft, is applied, such arcal jaws being shown at A A in the drawings. Each jaw, nearly semicircular in section, has extending through it at its middle, transversely thereof, a wide groove, $a$, such grooves being to receive two correspondingly-shaped ears, $b$, extending from a head, $c$, fixed concentrically upon one end of a tubular shank, $d$. Besides the grooves, the jaws are provided with lugs $e$, projecting from them, as shown in Figs. 1 and 2, there being fixed in such lugs two pairs of screws, $f$, those of each pair being arranged as represented in Fig. 2—that is, with their axes in line with each other—one screw of each pair being "right-threaded" and the other "left-threaded." Each pair is screwed into one of two arms, $g$, such arms being arranged between the lugs $e$ in manner as represented, and jointed at their free ends to two toggles, $h$, which in turn are jointed to a sleeve, B, encompassing and adapted to slide lengthwise upon the shank $d$. This sleeve is grooved transversely, as shown at $h'$, to receive a fork or lever for moving it on the shank longitudinally thereof.

Figure 3:
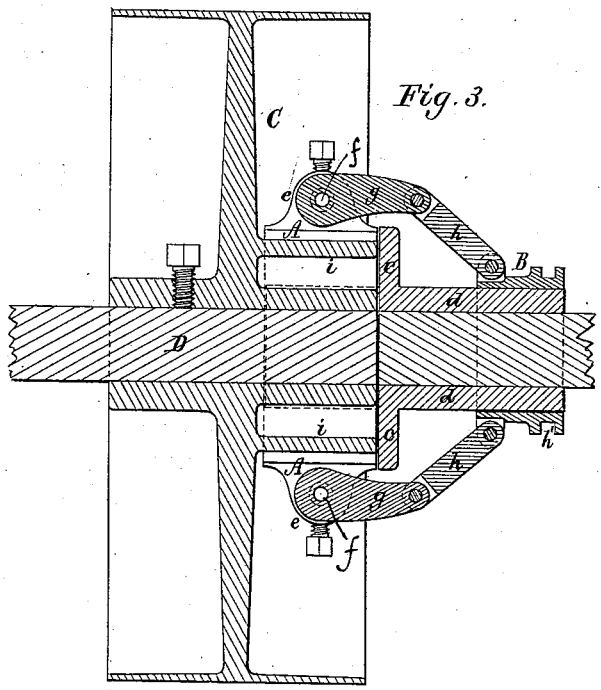

In Fig. 3 the clutch is represented as applied to a cylindrical tubular projection, $i$, extending from a wheel or pulley, C, fixed on a shaft, D, the jaws A embracing such projection. On the sleeve being slid one way upon the shank the arms $g$ will be moved on their screws $f$ in a manner to cause the jaws to be drawn toward each other and clamped on the tubular projection $i$, a reverse movement of the sleeve indirectly causing a movement of the jaws away from the projection.

I claim—

The improved friction-clutch consisting of the tubular shank $d$, having a head, $c$, provided with ears $b$ $b$, extending in opposite direction to the shank, the two arcal jaws A, grooved at their middles to receive the said ears, and having lugs $e$ extending from them, (the said jaws,) as represented, near their ends, the two sets of right and left threaded screws $f$, fixed and arranged, as shown, in the lugs $e$, the internally-screw-threaded arms $g$, adapted to turn on the said screws, the sleeve B, encompassing and movable endwise on the shank, and the toggles $h$, jointed to the said sleeve and the internally-screw-threaded arms, all being arranged and to operate essentially as set forth.

HENRY BARNES.

Witnesses:
R. H. EDDY,
R. B. TORREY.